(12) United States Patent
Coman et al.

(10) Patent No.: US 10,539,705 B2
(45) Date of Patent: Jan. 21, 2020

(54) FORMATION EVALUATION UTILIZING DUAL WAIT TIME NUCLEAR MAGNETIC RESONANCE

(71) Applicants: Radu Coman, Hannover (DE); Holger Tietjen, Hannover (DE); Holger F. Thern, Hannover (DE); Martin Blanz, Celle (DE)

(72) Inventors: Radu Coman, Hannover (DE); Holger Tietjen, Hannover (DE); Holger F. Thern, Hannover (DE); Martin Blanz, Celle (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 535 days.

(21) Appl. No.: 14/920,436

(22) Filed: Oct. 22, 2015

(65) Prior Publication Data

US 2016/0116629 A1 Apr. 28, 2016

Related U.S. Application Data

(60) Provisional application No. 62/067,520, filed on Oct. 23, 2014.

(51) Int. Cl.
*G01V 3/32* (2006.01)
*G01V 3/38* (2006.01)
*G01V 3/40* (2006.01)

(52) U.S. Cl.
CPC ............. *G01V 3/32* (2013.01); *G01V 3/38* (2013.01); *G01V 3/40* (2013.01)

(58) Field of Classification Search
CPC ...................................................... G01V 3/32

USPC .................................................. 324/303, 309
See application file for complete search history.

(56) References Cited

U.S. PATENT DOCUMENTS

| 4,629,986 | A | 12/1986 | Clow et al. |
| 5,486,762 | A * | 1/1996 | Freedman ............ G01N 24/081 324/303 |
| 6,331,775 | B1 | 12/2001 | Thern et al. |
| 6,392,409 | B1 | 5/2002 | Chen |
| 7,126,333 | B2 * | 10/2006 | Beard .................. G01N 24/081 324/303 |
| 7,196,516 | B2 | 3/2007 | Blanz et al. |
| 7,358,725 | B2 | 4/2008 | Blanz |
| 7,825,661 | B2 | 11/2010 | Blanz |

(Continued)

OTHER PUBLICATIONS

Akkurt, R. 1991. Effects of Motion in Pulsed NMR Logging. PhD Thesis, Colorado School of Mines, Golden, Colorado, 177 Pages.

(Continued)

*Primary Examiner* — Reena Aurora
(74) *Attorney, Agent, or Firm* — Cantor Colburn LLP (57) ABSTRACT

A system for measuring a property of fluid in an earth formation includes a downhole tool disposed in a borehole and configured to be movable within the borehole and a nuclear magnetic resonance (NMR) measurement device including a transmitter configured to emit at least two pulse trains of magnetic energy into the earth formation and a detector configured to detect a long-TW echo train and a short-TW echo train resulting from the at least two pulse trains. The system also includes a processor configured to combine the information from the at least two pulse trains and a rate of penetration of the downhole tool to form a measurement of the property.

16 Claims, 9 Drawing Sheets

(56) References Cited

U.S. PATENT DOCUMENTS

| | | | |
|---|---|---|---|
| 8,952,690 | B2 | 2/2015 | Blanz et al. |
| 9,671,483 | B2 | 6/2017 | Blanz et al. |
| 2003/0006766 | A1 | 1/2003 | Kruspe et al. |
| 2003/0141869 | A1 | 7/2003 | Prammer |
| 2005/0248342 | A1 | 11/2005 | Rottengatter et al. |
| 2005/0272158 | A1 | 12/2005 | Galford et al. |
| 2007/0222443 | A1 | 9/2007 | Blanz |
| 2015/0241541 | A1 | 8/2015 | Blanz et al. |

OTHER PUBLICATIONS

Akkurt, R., Vinegar, H.J., Tutunjian, P.N. et al. Nov.-Dec. 1996. NMR Logging of Natural Gas Reservoirs. The Log Analyst 37(6): 33-42.

Borghi, M., Porrera, F., Lyne, A., Kruspe, T. et al. Magnetic Resonance While Drilling Streamlines Reservoir Evaluation. Presented at the SPWLA 46th Annual Logging Symposium, New Orleans, Louisiana, Jun. 26-29, 2005.. SPWLA-HHH, 10 pages.

Christensen, S.A, Thern, H.F., and Vejbwk, O. NMR Fluid Substitution Method for Reservoir Characterization and Drilling Optimization in Low-Porosity Chalk. Presented at the SPWLA 56th Annual Symposium, Jul. 18-22, 2015 SPWLA-TBD, 23 pages.

Coates, G. R., Xiao, L., and Prammer, M. G. 1999. NMR logging: principles and applications. Houston: Halliburton Energy Services., 253 pages.

Coman, R., Tietjen, H., Thern, H., and Blanz, M. 2014. New Large-Hole Magnetic Resonance Logging-While-Drilling Tool with Short Inter-Echo Time and Improved Vertical Resolution. Presented at the SPWLA 55th Annual Logging Symposium, Abu Dhabi, United Arab Emirates, May 18-22. SPWLA-KKKK., 16 pages.

DePavia, L., Heaton, N., Ayers, D. et al. 2003. A Next-Generation Wireline NMR Logging Tool, Presented at the SPE Annual Technical Conference and Exhibition, Denver, Colorado, Colorado, Oct. 5-8. SPE-84482-MS, 7 pages.

Dunn, K. J., Bergman, D. J., and LaTorraca, G. A. 2002. "Nuclear Magnetic Resonance: Petrophysical and Logging Applications". Seismic Exploration, vol. 32 Elsevier., 303 pages.

Edwards, C. M. 1997. Effect of Tool Design and Logging Speed on T2 NMR Log Data. Presented at the SPWLA 38th Annual Logging Symposium, Houston, Texas, Jun. 15-18, SPWLA-RR, 13 pages.

Goelman, G. and Prammer, M.G. 1995. "The CPMG Pulse Sequence in Strong Magnetic Field Gradients with Applications to Oil-Well Logging". Journal of Magnetic Resonance, Series A 113: 11-18, 8 pages.

Heaton, N., Jain, V., Boling, B. et al. 2012. New Generation Magnetic Resonance While Drilling. Presented at the SPE Annual Technical Conference and Exhibition, San Antonio, Texas, USA, Oct. 8-10. SPE-160022-MS., 13 pages.

Heidler, R., Morriss, C., and Hoshun, R. 2003. Design and Implementation of a New Magnetic Resonance Tool for the While Drilling Environment. Presented at the SPWLA 44th Annual Logging Symposium, Galveston, Texas, Jun. 22-25. SPWLA-BBB., 10 pages.

Horkowitz, J., Crary, S., Ganesan, K. et al. 2002. Applications of a new Magnetic Resonance Logging-While-Drilling Tool in a Gulf of Mexico Deepwater Development Project. Presented at the SPWLA 43rd Annual Logging Symposium, Oiso, Japan, Jun. 2-5. SPWLA-EEE., 14 pages.

International Preliminary Report on Patentability for Application No. PCT/US2015/057067, dated May 4, 2017 12 pages.

Jachmann, R., Yang, J., and Chen, S. 2011 New Data Processing with new Generation Magnetic Resonance While Drilling Tool. Presented at the SPWLA 54th Annual Logging Symposium, New Orleans, Louisiana, Jun. 22-26. SPWLA-UU., 10 pages.

Jackson, J. "Nuclear Magnetic Resonance Well Logging" , Sep.-Oct. 1984, 15 pages.

Jackson, J. A., Burnett, L. J., and Harmon, J. F. 1980. Remote (inside-out) NMR. III. Detection of nuclear magnetic resonance in a remotely produced region of homogeneous magnetic field. Journal of Magnetic Resonance (1969) 41(3): 411-421.

Kleinberg, R.L., Straley, C., Kenyon, W.E. et al. 1993. Nuclear Magnetic Resonance of Rocks: T1 vs. T2. Presented at the SPE Annual Technical Conference and Exhibition, Houston, Texas, Oct. 3-6. SPE-26470-MS., 11 pages.

Kruspe, T., Thern, H. F., Kurz, G. et al. 2009. Slimhole Application of Magnetic Resonance While Drilling. Presented at be SPWLA 50th Annual Logging Symposium, The Woodlands, Texas, Jun. 21-24. SPWLA-EEEE., 15 pages.

Menger, S. and Sands, P., NMR in Motion. Petrophysics 44(3): May-Jun. 2013; p. 190-195.

Morley, J., Heidler, R., Horkowitz, J. et al. 2002. Field Testing of a New Nuclear Magnetic Resonance Logging-While-Drilling Tool. Presented at the SPE Annual Technical Conference and Exhibition, San Antonio, Texas, Sep. 29-Oct. 2. SPE-77477-MS., 12 pages.

Notification of Transmittal of the International Search Report of the International Searching Authority, or the Declaration; PCT/US2015/057067; dated Aug. 10, 2016, 4 pages.

Notification of Transmittal of the Written Opinion of the International Searching Authority, or the Declaration; PCT/US2015/057067; dated Aug. 10, 2016, 10 pages.

Prammer, M. G., Goodman, G. D., Menger, S. K. et al. 2000. Field test of an experimental NMR LWD device. Presented at the SPWLA 41st Annual Logging Symposium, Dallas, Texas, Jun. 4-7. SPWLA-EEE., 9 pages.

Prammer, M.G., Mardon, D., Coates, G.R. et al. 1995. Lithology-Independent Gas Detection by Gradient-NMR Logging. Presented at the SPE Annual Technical Conference and Exhibition, Dallas, Texas, Oct. 22-25, SPE-30562-MS., 12 pages.

Thorsen, A.K., Eiane, T., Thern, H. et al. 2010. Magnetic Resonance in Chalk Horizontal Well Logged with LWD. SPE Res Eval & Eng 13(4): 654-666. SPE-115699-PA. , 16 pages.

Extended European Search Report for International Application No. 15878258.1 dated Jun. 11, 2018, 10 pages.

Feng Deng et al, "Effects and Corrections for Mobile NMR Measurement", Applied Magnetic Resonance. vol. 44, No. 9, Jun. 8, 2013, pp. 1053-1065.

Xie Ranhong et al., "Advanced Fluid-Typing Methods for NMR Logging", Petroleum Science, China University of Petroleum (Beijing), Heidelberg, vol. 8, No. 2, May 28, 2011, pp. 163-169.

* cited by examiner

FORMATION EVALUATION UTILIZING DUAL WAIT TIME NUCLEAR MAGNETIC RESONANCE

CROSS REFERENCE TO RELATED APPLICATIONS

This application claims the benefit of an earlier filing date from U.S. Provisional Application Ser. No. 62/067,520 filed Oct. 23, 2014, the entire disclosure of which is incorporated herein by reference.

BACKGROUND

In hydrocarbon exploration operations, well boreholes are drilled by rotating a drill bit attached to a drillstring, and may be bored vertically or bored in selected directions via geosteering operations. Various downhole devices located in a bottomhole assembly (BHA) or other locations along the drillstring measure operating parameters, formation characteristics, and include sensors for determining the presence of hydrocarbons.

One type of device used to measure downhole properties is a nuclear magnetic resonance (NMR) device. An NMR device creates a magnetic field that excites nuclei and causes them to precess around the direction of the magnetic field. The energy related to the moving nuclei can be measured and information about a sample of interest (e.g. a fluid in a formation or wellbore) may be ascertained.

Porosity and the other NMR answer products (e.g., fluid volumetrics, permeability, saturation, viscosity, fluid typing, pore size distribution) are affected by axial and lateral motion (or lateral vibrations) of the NMR tool and by the uncertainty related to the hydrogen index (HI) correction. One approach to reduce the axial movement affects is to reduce the rate of penetration (ROP) of the drillstring and, consequently, NMR device.

SUMMARY OF THE INVENTION

Disclosed is a system for measuring a property of fluid in an earth formation including a downhole tool disposed in a borehole and configured to be movable within the borehole and a nuclear magnetic resonance (NMR) measurement device including a transmitter configured to emit at least two pulse trains of magnetic energy into the earth formation and a detector configured to detect a long-TW echo train and a short-TW echo train resulting from the at least two pulse trains. The system also includes a processor configured to combine the information from the at least two pulse trains and a rate of penetration of the downhole tool to form a measurement of the property.

Also disclosed is a method for measuring a property of fluid in an earth formation. The method includes: disposing a downhole tool in a borehole; emitting with a nuclear magnetic resonance (NMR) measurement device including a transmitter configured to emit at least two pulse trains of magnetic energy into the earth formation; detecting with a detector on the NMR device a long-TW echo train and a short-TW echo train resulting from the at least two pulse trains; and combining the information from the at least two pulse trains and a rate of penetration of the downhole tool to form a measurement of the property.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

Apparatuses and methods for characterizing subterranean formations are described herein. An embodiment of a method includes measuring magnetic resonance (MR) in a formation using a magnetic resonance device, such as a low-gradient nuclear magnetic resonance (NMR) tool. In one embodiment, the device is a logging-while-drilling (LWD) device configured to take MR measurements at a series of depths or regions of a formation.

Figure 1:
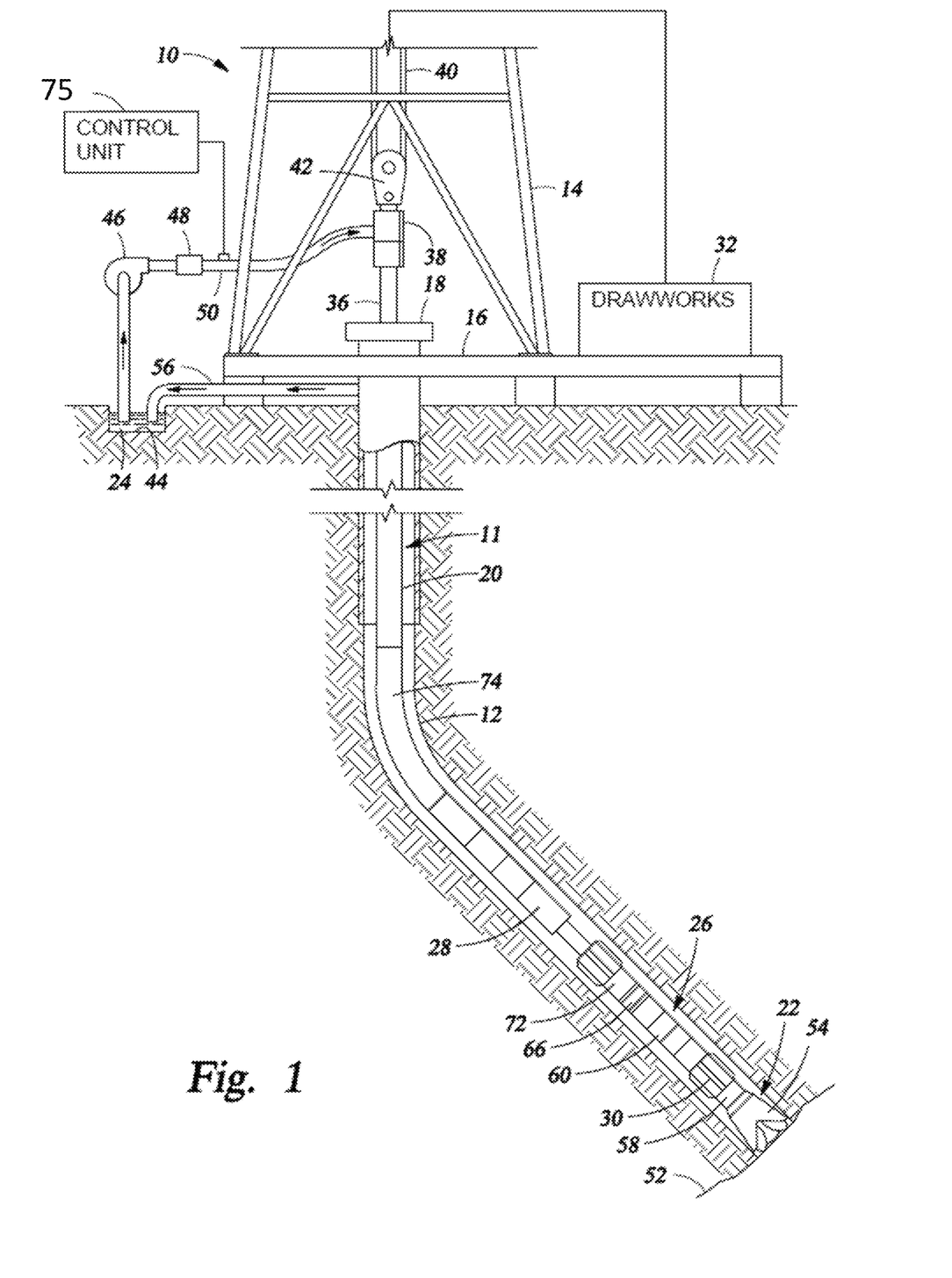
FIG. 1 is a side cross-sectional view of an embodiment of a drilling and/or geosteering system.

Referring to FIG. 1, an exemplary embodiment of a well-drilling and/or geosteering system 10 includes a drillstring 11 that is shown disposed in a borehole 12 that penetrates at least one earth formation during a drilling operation and makes measurements of properties of the formation and/or the borehole 12 downhole. In one embodiment, such measurements are NMR measurements of properties of the formation. Such NMR measurements include, for example, NMR relaxation times.

As described herein, "borehole" or "wellbore" refers to a single hole that makes up all or part of a drilled well. As described herein, "formations" refer to the various features and materials that may be encountered in a subsurface environment and surround the borehole.

In one embodiment, the system 10 includes a conventional derrick 14 mounted on a derrick floor 16 that supports a rotary table 18 that is rotated by a prime mover at a desired rotational speed. The drillstring 11 includes one or more drill pipe sections 20 or coiled tubing that extend downward into the borehole 12 from the rotary table 18, and is connected to a drill bit assembly 22. Drilling fluid, or drilling mud 24 is pumped through the drillstring 11 and/or the borehole 12. The well drilling system 10 also includes a bottomhole assembly (BHA) 26.

The drill bit assembly 22 is powered by a surface rotary drive, a motor using pressurized fluid (e.g., a mud motor), an electrically driven motor and/or other suitable mechanism. In one embodiment, a drill motor or mud motor 28 is coupled to the drill bit assembly 22 via a drive shaft disposed in a bearing assembly 30 that rotates the drill bit assembly 22 when the drilling fluid 24 is passed through the mud motor 28 under pressure. The bearing assembly 30 supports the radial and axial forces of the drill bit, the downthrust of the drill motor and the reactive upward loading from the applied weight on bit.

In one embodiment, the drillstring 11 is coupled to a drawworks 32 via a kelly joint 36, a swivel 38 and a line 40 through a pulley 42. During the drilling operation the drawworks 32 is operated to control drilling parameters such as the weight on bit and the rate of penetration ("ROP") of the drillstring 11 into the borehole 12.

During drilling operations a suitable drilling fluid 24 from a mud pit 44 is circulated under pressure through the drillstring 11 by a mud pump 46. The drilling fluid 24 passes from the mud pump 46 into the drillstring 11 via, for example, a desurger 48, a fluid line 50 and the kelly joint 36. The drilling fluid is discharged at a borehole bottom 52 through an opening in a drill bit 54. The drilling fluid circulates uphole between the drill string 11 and the borehole 12 and is discharged into the mud pit 44 via a return line 56.

In one embodiment, the drill bit assembly 22 includes a steering assembly including a shaft 58 connected to the drill bit 54. The shaft 58, which in one embodiment is coupled to the mud motor, is utilized in geosteering operations to steer the drill bit 54 and the drillstring 11 through the formation.

In one embodiment, the drilling assembly 22 is included in the bottomhole assembly (BHA) 26, which is disposable within the well logging system 10 at or near the downhole portion of the drillstring 11. The BHA 26 includes any number of downhole tools 60 for various processes including formation drilling, geosteering, and formation evaluation (FE) for measuring versus depth and/or time one or more physical quantities in or around a borehole.

The downhole tool 60, in one embodiment, includes at least one NMR tool to measure formation properties. The downhole tool 60, in this embodiment, is configured to apply a radiofrequency magnetic field to a portion of the formation surrounding the downhole tool 60 and receive a NMR signal indicative of certain components. Although the NMR tools are described in this embodiment as disposed within the drillstring 11, the NMR tools may be used in conjunction with any structure suitable to lower the NMR tools into a borehole, such as a wireline. The measurements may be performed while the NMR device is rotating in one embodiment.

When the radiofrequency magnetic field covering at least one specific frequency band is applied to a certain substance, at least one resonance frequency is generated to excite the nuclei of surrounding substance. In one embodiment, relaxation times are used to determine the properties of the substance. The times that may be used include a least one of a longitudinal relaxation or spin lattice relaxation time "T1", a transversal or spin-spin relaxation time "T2", a free induction decay (FID) time "T2*", and a pulsed spin locking decay time "T2e".

One way to reduce axial motion related effects of NMR measurements is to reduce the ROP. Further, an ROP correction is in principle possible, but it is usually not used because it requires an accurate T1 distribution as input. One method to get a T1 distribution is by multiplying the T2 distribution with a constant factor, R, i.e., T1=R*T2. This method is not robust because R is not known a priori and using a typical R might be not correct in an individual case. In addition, the T2 distribution depends on many parameters (wettability, diffusion, internal field gradients, surface relaxivity, and lateral motion) and some of these parameters are hard to measure or to estimate. Additionally, the T2 distribution might be inaccurate due to noisy data and/or due to a pulse sequence which is too short for long T2 values.

Handling the effect of lateral motion (or lateral vibration) is even more difficult than handling the effect of axial motion. A further drawback of the current NMR logging methods is due to the uncertainty related to the HI correction. The uncertainty is especially large in gas reservoirs with unknown amount of mud filtrate invasion.

Disclosed herein are systems and methods that utilize a dual wait time (DTW) NMR measurement to determine T1 for a fluid while considering an ROP effect (axial motion). The determined T1 value can be in turn used for polarization correction, and for HI correction. This may allow for NMR while drilling measurements at higher ROP than previously allowed. Moreover, the improved corrections lead to a more accurate NMR porosity and to an improved quality of the other NMR answer products.

Referring again to FIG. 1, in one embodiment, the tool 60 is equipped with transmission equipment 72 to communicate ultimately to a surface processing unit 75. In one embodiment, the surface processing unit 75 is configured as a surface drilling control unit which controls various drilling parameters such as rotary speed, weight-on-bit, drilling fluid flow parameters and others and records and displays real-time formation evaluation data. Such transmission equipment 72 may take any desired form, and different transmission media and connections may be used. Examples of connections include wired, fiber optic, wireless connections or mud pulse telemetry.

In one embodiment, the surface processing unit 75 and/or the tool 60 include components as necessary to provide for storing and/or processing data collected from various sensors therein. Exemplary components include, without limitation, at least one processor, storage, memory, input devices, output devices and the like. The surface processing unit 75 optionally is configured to control the tool 60.

Figure 2:
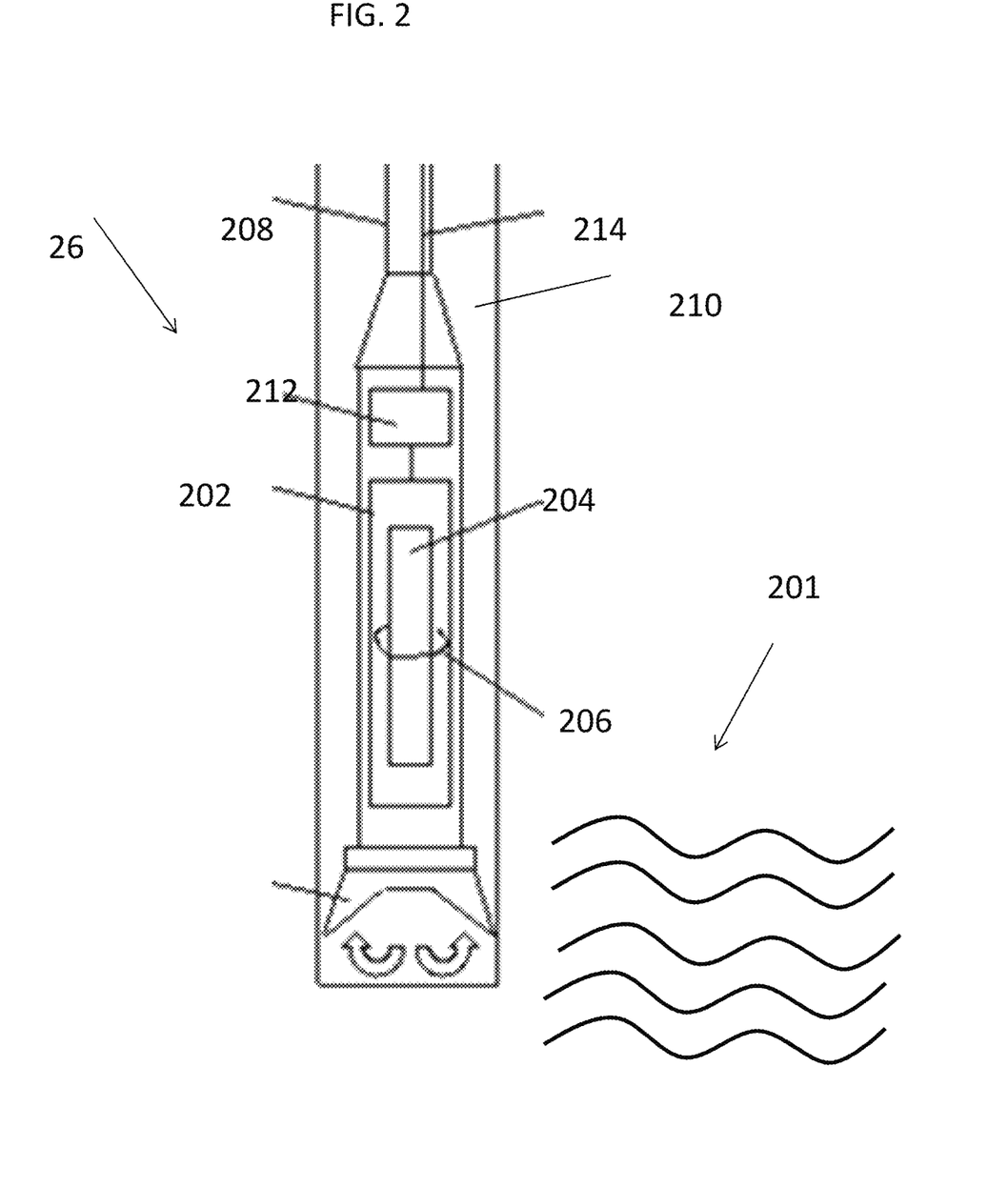
FIG. 2 is a perspective view of an exemplary embodiment of a nuclear magnetic resonance (NMR) measurement apparatus.

Generally, some of the teachings herein are reduced to an algorithm that is stored on machine-readable media. The algorithm is implemented by a computer or processor such as the surface processing unit 75 or electronics unit 66 and provides operators with desired output. For example, electronics unit 66 may store and process data downhole, or store data for later retrieval after the tool 60 is tripped out. In another example, data may be transmitted in real time to the surface processing unit 75 via wireline, or by any kind of telemetry such as mud pulse telemetry or wired pipes during an LWD operation FIG. 2 shows an example of a BHA 26 that includes devices or systems for in-situ measurement of characteristics of an earth formation 201. The BHA includes a magnetic resonance tool 202 such as a nuclear magnetic resonance (NMR) tool. An example of the magnetic resonance tool is a LWD magnetic resonance tool such as the MagTrak™ LWD tool by Baker Hughes, Inc. The tool 202 is configured to generate magnetic resonance data for use in estimating characteristics of the formation 201 and, more particularly, to a fluid in the formation. As described herein, a "fluid" refers to a liquid, gas, or a combination thereof. In one embodiment, the fluid is primarily oil and/or water in the formation. Other characteristics that can be estimated using the tool 202 include porosity and permeability.

An exemplary tool 202 includes a static magnetic field source 204 that magnetizes formation materials and an antenna 206 that transmits radio-frequency energy or other oscillating or pulsed energy that provides an oscillating magnetic field. The antenna may also serve as a receiver. It can be appreciated that the tool 202 may include a variety of components and configurations as known in the art of magnetic resonance and/or NMR.

The tool 202 may be configured as a component of various subterranean systems, such as well logging and logging-while-drilling (LWD) systems. For example, the tool 202 can be incorporated with a drill string 208 or other suitable carrier and deployed downhole, e.g., from a drilling rig into a borehole 210 during a drilling operation. The tool 202 is not limited to the embodiments described herein, and may be disposed with any suitable carrier. A "carrier" as described herein means any device, device component, combination of devices, media and/or member that may be used to convey, house, support or otherwise facilitate the use of another device, device component, combination of devices, media and/or member. Exemplary non-limiting carriers include drill strings of the coiled tube type, of the jointed pipe type and any combination or portion thereof. Other carrier examples include casing pipes, wirelines, wireline sondes, slickline sondes, drop shots, downhole subs, bottom-hole assemblies, and drill strings.

In one embodiment, the tool 202 and/or other downhole components are equipped with transmission equipment to communicate ultimately to a surface processing unit. Such transmission equipment may take any desired form, and different transmission media and methods may be used, such as wired, fiber optic, and wireless transmission methods. Additional processing units may be disposed with the carrier. For example, a downhole electronics unit 212 includes various electronic components to facilitate receiving signals and data, transmitting data, and/or processing data downhole. The surface processing unit, the tool 202 and/or other components of the system include devices as necessary to provide for storing and/or processing data collected from the tool 202 and other components of the system. Exemplary devices include, without limitation, at least one processor, storage, memory, input devices, output devices and the like.

In support of the teachings herein, various analyses and/or analytical components may be used, including digital and/or analog systems. The system may have components such as a processor, storage media, memory, input, output, communications link (wired, wireless, pulsed mud, optical or other) 214, user interfaces, software programs, signal processors (digital or analog) and other such components (such as resistors, capacitors, inductors and others) to provide for operation and analyses of the apparatus and methods disclosed herein in any of several manners well-appreciated in the art.

Further, various other components may be included and called upon for providing aspects of the teachings herein. For example, a sample line, sample storage, sample chamber, sample exhaust, pump, piston, power supply (e.g., at least one of a generator, a remote supply and a battery), vacuum supply, pressure supply, refrigeration (i.e., cooling) unit or supply, heating component, motive force (such as a translational force, propulsional force or a rotational force), magnet, electromagnet, sensor, electrode, transmitter, receiver, transceiver, controller, optical unit, electrical unit or electromechanical unit may be included in support of the various aspects discussed herein or in support of other functions beyond this disclosure.

Figure 3:
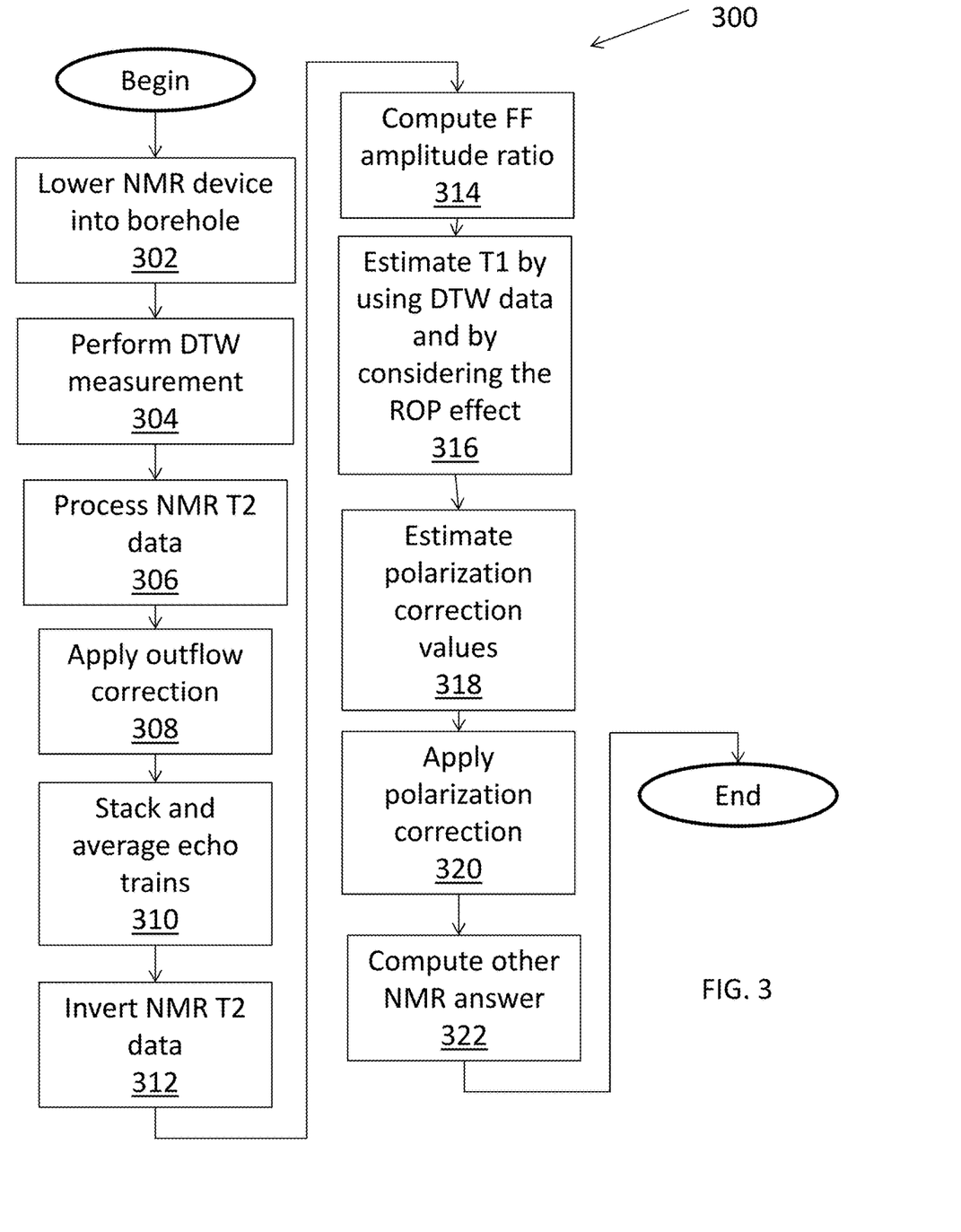
FIG. 3 is a flow chart providing an exemplary method of computing an NMR answer.

FIG. 3 illustrates an example of method 300 according to one embodiment. The method uses a DTW NMR measurement to determine T1 for the free fluid (FF) while considering the axial motion effect (ROP for NMR while drilling (NMR-WD); logging speed for wireline NMR). The method can be used to improve the quality of NMR answer products (e.g., fluid volumetrics, vuggy porosity, permeability, fluid typing, HI, saturation, hydrocarbon (HC) composition, viscosity, pore size distribution). One application of the method would be as an NMR-WD service in light hydrocarbon (gas and light oil) reservoirs and in carbonates with vuggy porosity.

At block 302, an NMR device is advanced into a borehole. This may occur in several manners. For instance, the NMR device could be coupled to a drillstring and is advanced into a borehole as it is drilled. The speed at which NMR device is advanced is referred to as the rate of penetration (ROP). In another embodiment, the NMR device may be part of wireline in which case it is advanced at a speed referred to as a logging speed. Regardless, the speed may affect the accuracy of NMR measurements if not properly accounted for.

While being advanced into the borehole, a dual wait time measurement is performed at block 304. "TW" shall refer to a wait time herein. Such a measurement includes at least two sequences: a "long-TW sequence" with a long wait time ($TW_L$) and a "short-TW sequence" with a short wait time ($TW_S$). In a particular embodiment, $TW_L$ includes two phase alternating paired (PAPed) sequences, $TW_S$ includes two PAPed sequences. In either embodiment, the DTW measurement may also include a clay bound water (CBW) measurement which consists of several PAPed CBW sequences.

In one embodiment, $TW_L>3*T_{1,LHC}$, where $T_{1,LHC}$ is the log-mean (or geometric mean) T1 for the light HC (gas or light oil) volumetric and $TW_S>3*T_{1,MW}$, where $T_{1,MW}$ is the log-mean T1 for the movable water volumetric. In another embodiment, different rules for the optimal selection of $TW_L$ and $TW_S$ may be used. The optimization might be done with respect to different criteria (e.g., vertical resolution, accurate T1). In one embodiment, an output of a measurement is two echo-train time series: channel X and channel Y (with 90° phase relation to each other) describing T2 relaxation.

Figure 4:
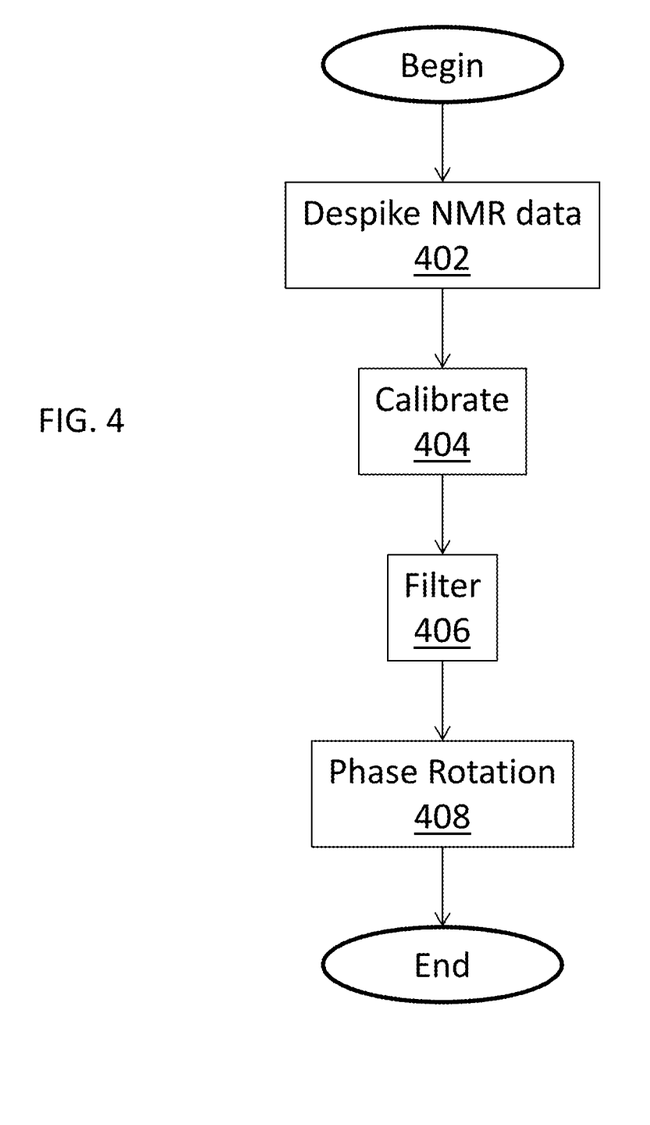
FIG. 4 is a flow chart providing an exemplary method to prepare NMR data for inversion.

At block 306 the NMR $T_2$ data is processed. With reference now to FIG. 4, the processing performed at block 306 may include an optional despiking (spike noise removal) of the data gathered in block 304 as indicated at block 402. At block 404, the data is calibrated. This may include, for example, multiplication of recorded NMR data with a calibration factor to transform the arbitrary units in porosity units. At block 406, the NMR is filtered to remove incomplete measurements. At block 408 the data is phase rotated in to a "signal channel".

Referring again to FIG. 3, at block 308 an optional outflow correction may be applied to the processed NMR data. In one embodiment, an "outflow correction" corresponds to the "motion correction A" described in U.S. Pat. No. 7,358,725, which is incorporated herein by reference. The outflow correction might be due to axial and radial movement of the tool. In one embodiment, the outflow correction of block 308 can be applied on phase rotated PAPed echo trains. Alternatively the order of this step and of the next block ("stack and average echo trains") might be interchanged and the outflow correction would be applied on the stacked and averaged echo trains.

Figure 5A:
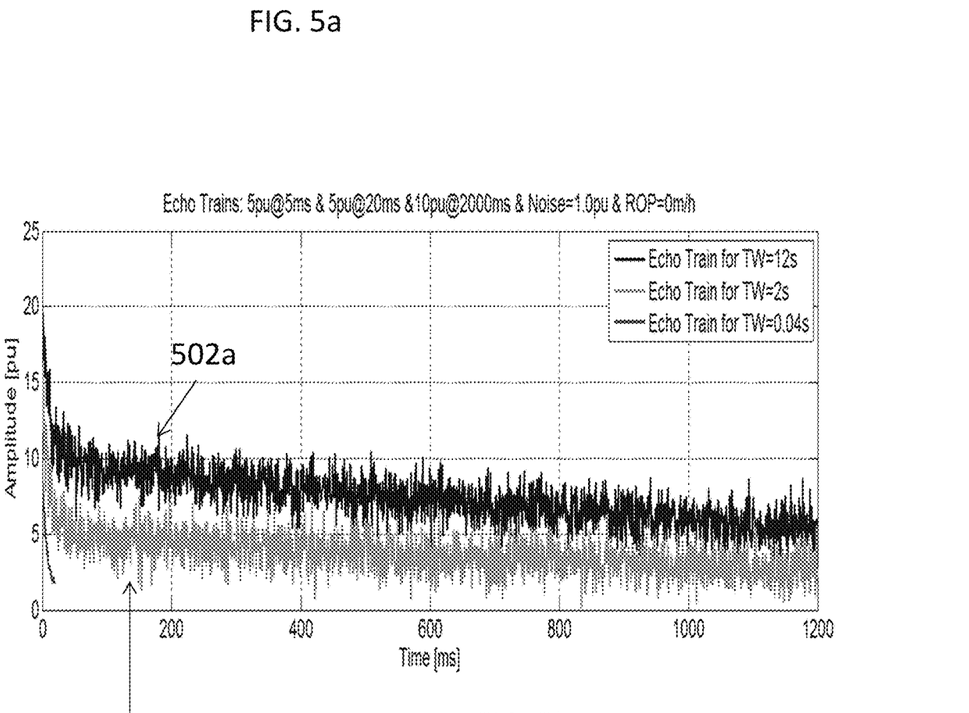
FIGS. 5a and 5b are graphs showing echo trains in time domain form and the corresponding T2 distribution after inversion.

At block 310, successive echo trains received during NMR measurements are stacked and averaged in a "running average" fashion to improve the signal-to-noise ratio. This processing step is known as "running average". FIG. 5A shows an example of two simulated stacked echo trains 502, 504. Echo train 502 is for a TW of 12 seconds and train 504 is for TW of 2 seconds.

At block 312 the NMR T2 data is inverted. The inversion transforms the data from the time domain (echo train data)

into the T2 domain (T2 distribution). The output of such an inversion yields two $T_2$ distributions: T2 distribution for the long TW ($TW_L$) and T2 distribution for the short TW ($TW_S$). Typically, two cutoffs split the T2 porosity distribution into three volumetrics: Clay Bound Water (CBW), Capillary Bound Water (BW) and Free Fluid (FF). The cutoff between CBW and BW is called CBW cutoff and is typically at 3.3 ms. The cutoff between BW and FF is called BVI (bulk volume irreducible) cutoff or CBVI. In one embodiment, CBVI is determined in laboratory with NMR measurements on core samples. In the absence of laboratory data, default values based on lithology may be used. For example, a CBVI of 33 ms may be used for sandstones and 92 ms may be used for carbonates.

Figure 5B:
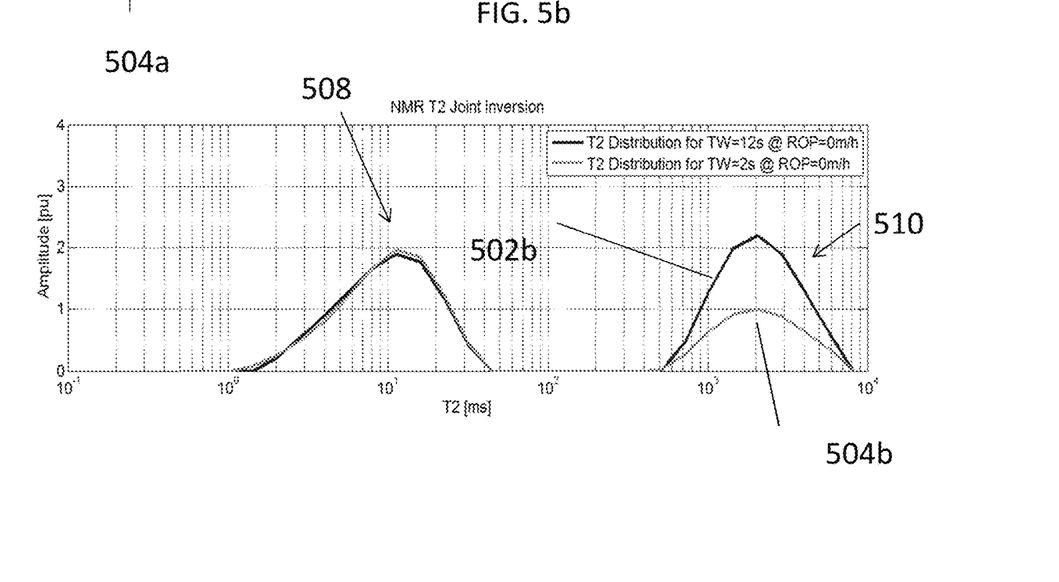

The inversion results of the echo trains shown in FIG. 5A are displayed in FIG. 5B. If the CBVI cutoff is assumed to be 100 ms, $FF_{TWL}$ would be the area in the T2 distribution delimited by curve 502b at T2>100 ms; $FF_{TWS}$ would be the area in the T2 distribution delimited by curve 504b at T2>100 ms. Of course, if the outflow correction was applied, then the notation for the volumetrics will change to FF_O, BW_O, and CBW_O ($_O$ means that the Outflow Correction was applied). The outflow correction mainly affects FF. The effect on CBW is negligible (CBW_O~=CBW).

Referring again to FIG. 3, at block 314, the FF amplitude ratio is calculated. Assuming only one distinctive peak in the inverted data, this process may include computing the amplitude ratio:

$$R_{TW,FF} = \frac{FF_{TWS}}{FF_{TWL}} \quad (1)$$

Equation 1 is useful with high T1 values (i.e., light oil, gas, and movable water in vuggy porosity) as the presence of a large T1 value leads to a large T2 value.

In some cases two peaks are observable in the FF domain. In the presence of more than one fluid in the FF volumetric it is recommended to split the FF volumetric into two volumetrics such as movable water (MW) volumetric (includes "medium oil") and Light HC (LHC) volumetric (includes also water in vuggy porosity).

If two peaks are observable in the FF T2 domain, then the cutoff ("light HC cutoff") would be the trough between the two peaks. This cutoff might be variable or fixed and it might be set by a human processor or by a software algorithm. If two distinctive peaks are present in the FF domain, then two amplitude ratios might be calculated:

$$R_{TW,MW} = \frac{MW_{TWS}}{MW_{TWL}}; \quad (3)$$

and $$R_{TW,LHC} = \frac{LHC_{TWS}}{LHC_{TWL}}. \quad (4)$$

In most cases $R_{TW,MW}$ should be close to 1 and a polarization correction is not necessarily required. Herein, $R_{TW}$ may be used as a synonym for $R_{TW,FF}$ or $R_{TW,LHC}$.

At block 316 T1 is estimated by using DTW data while considering the ROP effect. In particular, block 316 allows for an accurate estimation of T1 at every ROP. In more detail, T1 is calculated as function of $R_{FF}$, ROP, $TW_L$, $TW_S$, B0, and saturation method. Different saturation methods might be used for different wait times, e.g., use no saturation sequence for the long wait time and use complete saturation for short wait times.

Figure 6A:
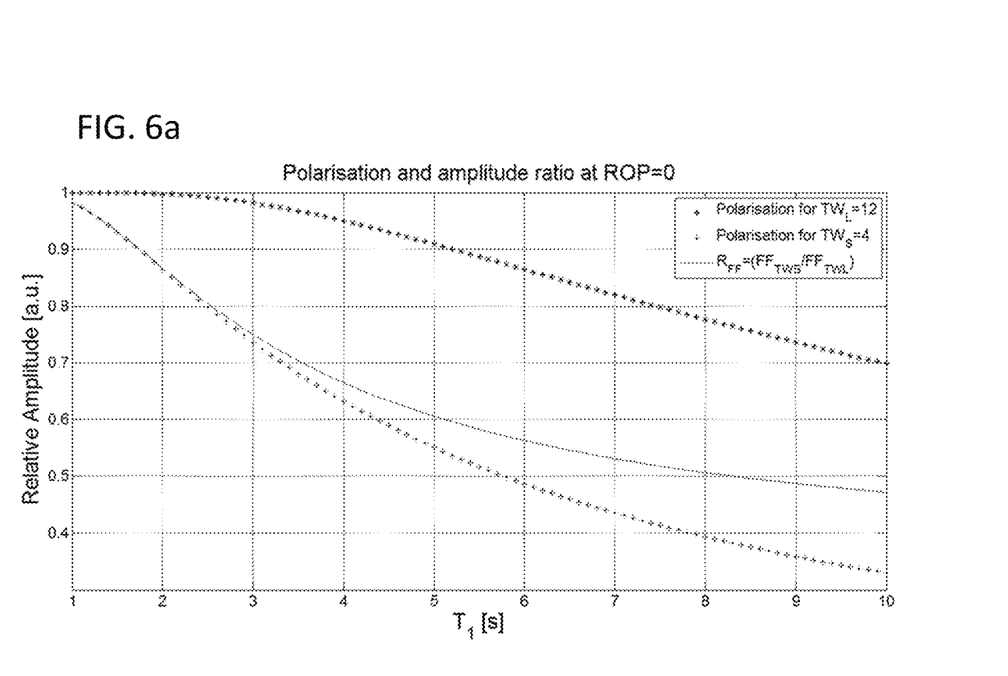
FIGS. 6a and 6b are graphs illustrating the difference in polarization responses at different ROPs.
Figure 6B:
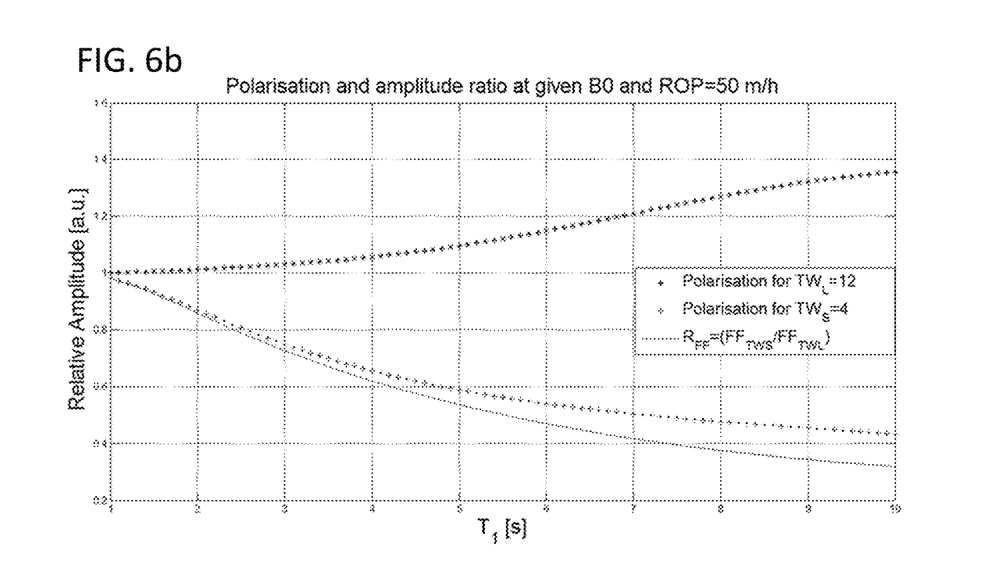

Reference is now made to FIGS. 6a and 6b. FIG. 6a shows the polarization and the amplitude ratio as function of T1 at ROP=0 m/h. The other input parameters are $TW_L$=12 s, and $TW_S$=4 s. In contrast, FIG. 6b shows the polarization and the amplitude ratio as function of T1 at ROP=50 m/h. The other input parameters are TWL=12 s, TWS=4 s, and the B0 field distribution (which depends on the tool design). As can be seen by comparing FIGS. 6a and 6b, considering the ROP effect, the estimated T1 value would be too large if only FIG. 6a was used. Of course, the effect of ROP on polarization depends on tool design. In the illustrated example, there is an overpolarization effect. For a different tool design ROP may lead to underpolarization.

As mentioned above, the inversion is not done on a single echo-train but on averaged echo-trains (RA is the number of averaged echo trains). Because the ROP is not constant during the whole drilling process, two approaches may be used to handle time varying ROP. First, assume an averaged echo train was built by averaging RA echo trains and let $ROP_i$ be the ROP at which the i$^{th}$ echo train (1≤i≤RA) was recorded.

Figure 7:
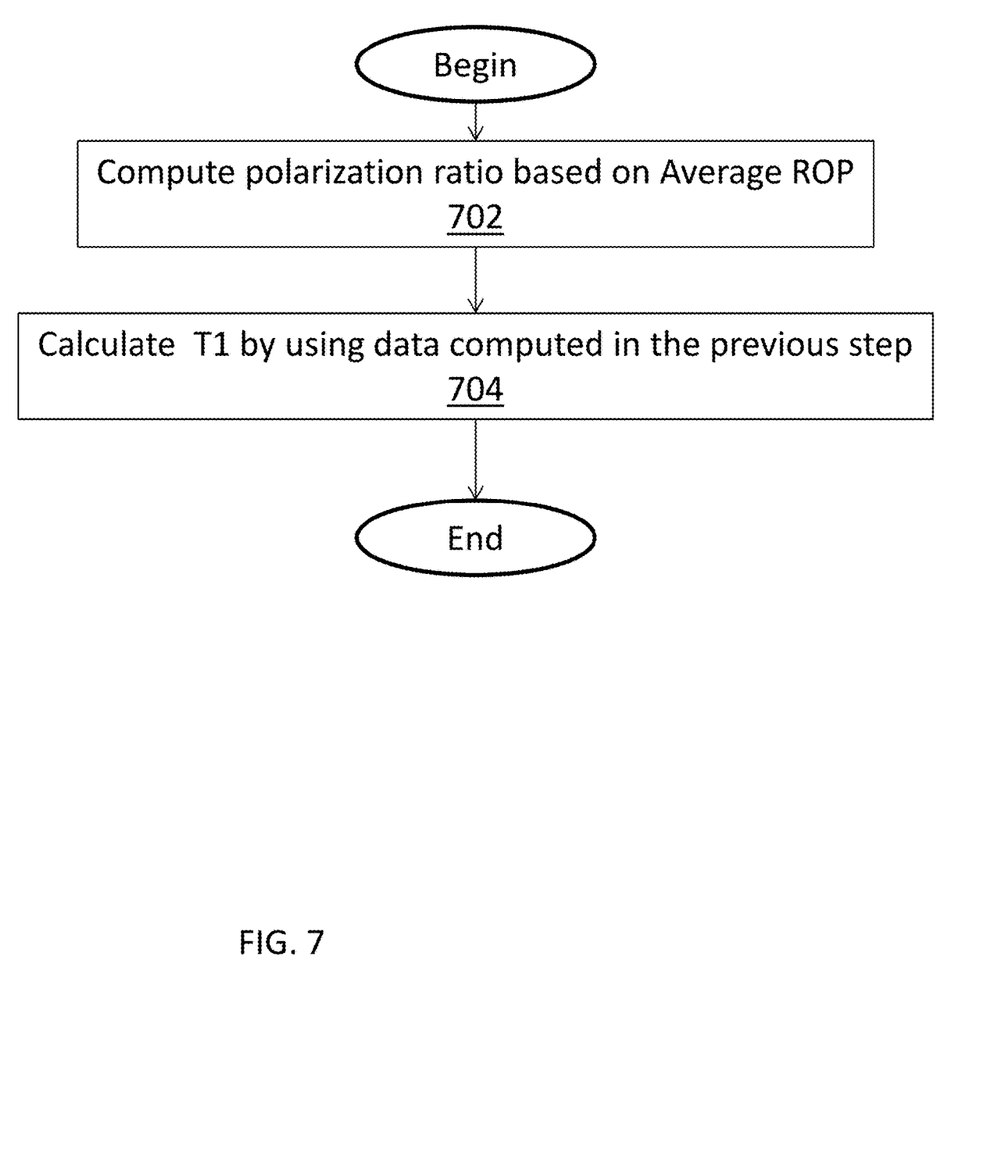
FIG. 7 is a flow chart illustrating a method of calculating T1 based on an average ROP.

One approach of performing the processing in block 316 is shown in FIG. 7. At block 702 the polarization is computed by using an averaged $ROP_{av}$. A further explanation of how this may be accomplished is provided in U.S. Pat. No. 7,358,725 which is incorporated herein by reference. $ROP_{av}$ may, in one embodiment, be computed with the formula:

$$ROP_{av} = \frac{\sum_{i=1}^{RA} ROP_i}{RA}.$$

Figure 8:
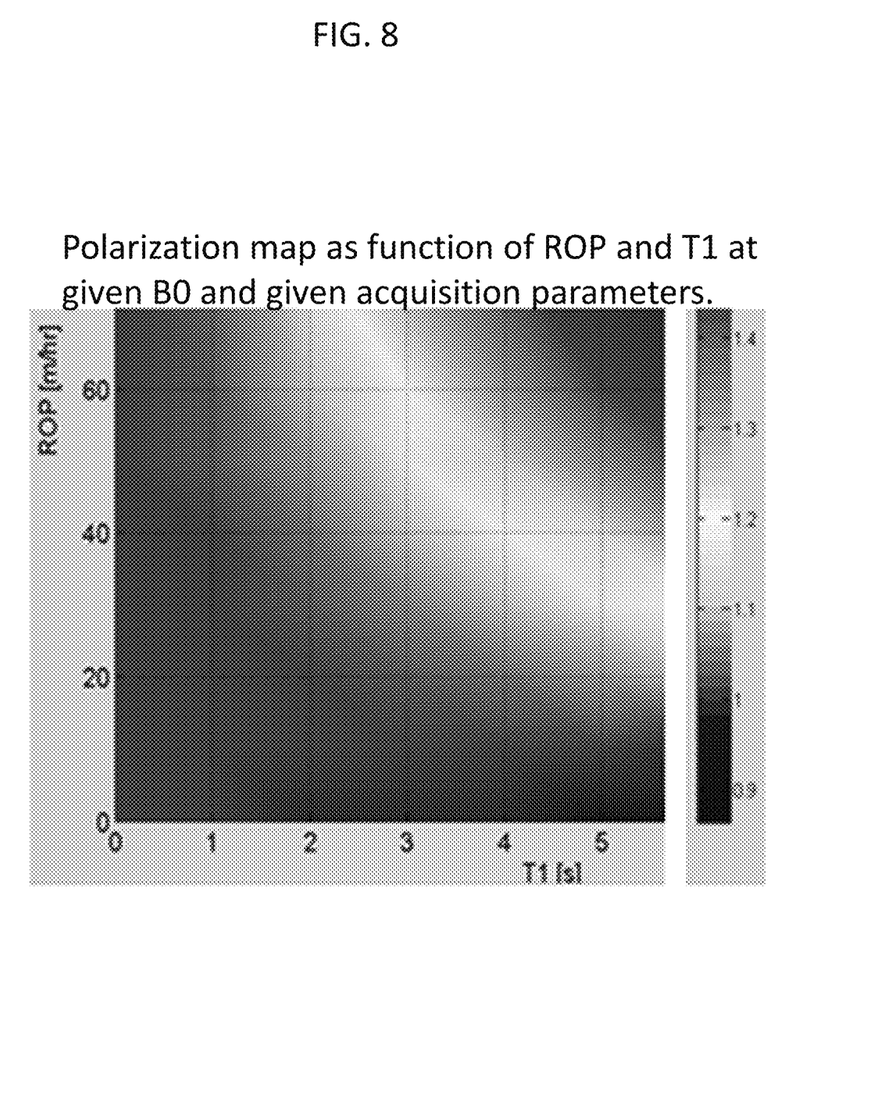
FIG. 8 is a polarization map as function of T1 and ROP at given B0 and given acquisition parameters (e.g. TW)

At block 704 T1 is then calculated as function of $R_{TW}$, $TW_L$, $TW_S$, $ROP_{av}$, B0, and saturation sequence using, for example, a polarization map as shown in FIG. 8.

Figure 9:
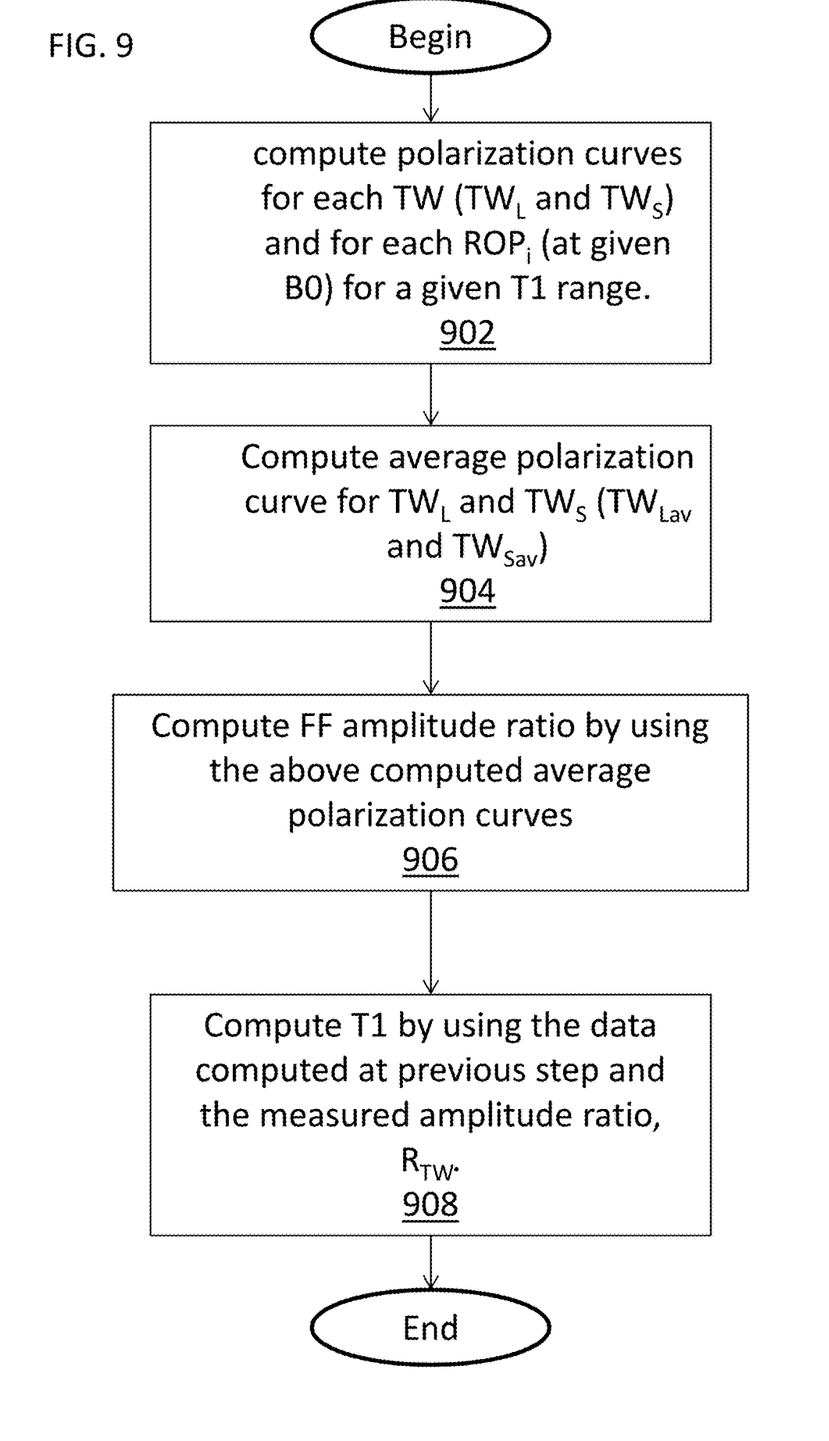
FIG. 9 is a flow chart illustrating a method of calculating T1 based on an amplitude ratio.

A second approach is shown in FIG. 9. In this approach, at block 902, the polarization curves are computed for each TW ($TW_L$ and $TW_S$) and for each $ROP_i$ (at given B0) for a given T1 range.

At block 904 average polarization curves are computed for $TW_L$ and $TW_S$ ($TW_{Lav}$ and $TW_{Sav}$) by using above computed polarization curves (for the given T1 range).

At block 906, the FF amplitude ratio is computed using the above computed average polarization curves (for the given T1 range) and at block 908 T1 is computed by using the data computed at previous step and the measured amplitude ratio, $R_{TW}$.

Referring again to FIG. 3, at block 318 amplitude correction values are estimated. This includes determining amplitude correction values for the used TW ($C_{TW}$) as function of given ROP and B0 and of the T1 estimated in block 316. The correction values can be also estimated by using charts similar to FIG. 6b (e.g., if T1 is 5 s, then $C_{TWS}$=0.6 and $C_{TWL}$=1.1.

At block 320 a polarization correction may be applied. This may include, for data recorded with the long wait time:

$$FF\_OP = \frac{FF\_O_{TWL}}{C_{TWL}}.$$

The underscores used in the formulas indicates the type of correction applied. For example FF_O is indicating that the outflow correction was applied to the free fluid. FF_OP is indicating that the outflow and polarization was applied. Alternatively the correction could consider also the data recorded with the short wait time according to:

$$FF\_OP = \frac{FF\_O_{TWL} + FF\_O_{TWS}}{C_{TWL} + C_{TWS}}$$

FF_OP can be also computed by using other formulas: FF_OP=func(FF_$O_{TWL}$, FF_$O_{TWS}$, $C_{TWL}$, $C_{TWS}$).

At block 322, the corrected porosity and the porosity distribution in the T1 and the T2 domain can be used for a more accurate computation of other NMR answer products (e.g., fluid volumetrics, vuggy porosity, permeability, fluid typing, HI, saturation, HC composition, viscosity, pore size distribution).

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for measuring a property of an earth formation, the system comprising:
    a downhole tool disposed in a borehole and configured to be movable within the borehole;
    a nuclear magnetic resonance (NMR) measurement device disposed in said downhole tool including a transmitter configured to emit a first pulse train with a long wait time ($TW_L$) and a second pulse train with a short wait time ($TW_S$) that is different than $TW_L$ into the earth formation and a detector configured to detect a $TW_L$ echo train and a $TW_S$ echo train resulting from the first and second pulse trains, respectively; and
    a processor configured to combine the information from the $TW_L$ and $TW_S$ echo trains and a speed of axial motion of the downhole tool to determine a T1 relaxation time and to perform a computation of the property of the earth formation based on the determined T1 relaxation time.

2. The system of claim 1, wherein the wait time of at least one of the first and second pulse trains is predetermined.

3. The system of claim 2, wherein the processor applies an outflow correction to the $TW_L$ echo train and the TWs echo train.

4. The system of claim 2, wherein the processor computes polarization data for at least one of the $TW_L$ echo train and $TW_S$ echo train.

5. The system of claim 4, wherein the processor:
    computes a polarization ratio based on at least a part of the polarization data; and
    computes T1 from the polarization ratio.

6. The system of claim 5, wherein:
    the processor determines a polarization curve from at least a part of the polarization data; and
    at least a part of the polarization curve is averaged.

7. The system of claim 1, wherein the processor:
    stacks and/or averages the echo trains received during NMR measurements; and
    transforms the $TW_L$ echo train and the $TW_S$ echo train from a time domain into a T2 domain to form a T2 distribution for the $TW_L$ echo train and a T2 distribution for the $TW_S$ echo train.

8. The system of claim 7, wherein the processor forms an amplitude ratio of at least a part of the T2 distribution for the $TW_L$ echo train and at least a part of the T2 distribution for the $TW_S$ echo train.

9. A method for measuring a property of an earth formation, the method comprising:
    disposing a downhole tool in a borehole;
    emitting with a nuclear magnetic resonance (NMR) measurement device disposed in said downhole tool a first pulse train with a long wait time ($TW_L$) and a second pulse train with a short wait time ($TW_S$) that is different than $TW_L$ into the earth formation;
    detecting with a detector on the NMR device a $TW_L$ echo train and a $TW_S$ echo train resulting from the first and second pulse trains, respectively; and
    combining with a processor the information from the $TW_L$ and $TW_S$ echo trains and a speed of axial motion of the downhole tool to determine a T1 relaxation time and perform a computation of the property of the earth formation based on the determined T1 relaxation time.

10. The method of claim 9, wherein the wait time of at least one of the first and second pulse trains is predetermined.

11. The method of claim 10, wherein combining includes applying an outflow correction.

12. The method of claim 10, wherein combining further includes:
    stacking and/or averaging the $TW_L$ and $TW_S$ echo trains received during NMR measurements; and
    transforming the $TW_L$ each train and the TWs each train from a time domain into a T2 domain to form a T2 distribution for the $TW_L$ echo train and a T2 distribution for the $TW_S$ echo train.

13. The method of claim 12, wherein combining includes forming an amplitude ratio of at least a part of the T2 distribution for the $TW_L$ echo train and the T2 distribution for the $TW_S$ echo train.

14. The method of claim 9, wherein combining includes computing polarization data for at least one of the $TW_L$ echo train and the $TW_S$ echo train.

15. The method of claim 14, wherein combining includes:
    computing a polarization ratio based on at least a part of the polarization data; and
    computing T1 from the polarization ratio.

16. The method of claim 15, wherein combining includes determining a polarization curve from at least a part of the polarization data; and
    at least a part of the polarization curve is averaged.

* * * * *